US00H002229H

(19) United States
(12) Statutory Invention Registration
Reason

(10) Reg. No.: US H2229 H
(43) Published: Feb. 3, 2009

(54) MOVABLE DECK TO MITIGATE EFFECTS OF SHOCK

(75) Inventor: William Reason, Lexington Park, MD (US)

(73) Assignee: The United States of America as represented by the Secretary of the Navy, Washington, DC (US)

(21) Appl. No.: 11/805,263

(22) Filed: May 17, 2007

(65) Prior Publication Data

US 2008/0282954 A1 Nov. 20, 2008

(51) Int. Cl.

| | |
|---|---|
| ***B63B 29/02*** | (2006.01) |
| ***B63B 17/00*** | (2006.01) |
| ***F16M 13/00*** | (2006.01) |

(52) U.S. Cl. ..... 114/71; 114/363; 248/636

(58) Field of Classification Search ..... 114/71, 114/363; 248/636

See application file for complete search history.

(56) References Cited

U.S. PATENT DOCUMENTS

| | | | | | |
|---|---|---|---|---|---|
| 3,389,673 | A | * | 6/1968 | Cuesta | 114/71 |
| 5,044,455 | A | * | 9/1991 | Tecco et al. | 180/89.13 |
| 5,207,408 | A | * | 5/1993 | Burg | 248/550 |
| 5,603,281 | A | * | 2/1997 | Harvey et al. | 114/363 |
| 6,182,596 | B1 | * | 2/2001 | Johnson | 114/284 |
| 6,276,653 | B1 | * | 8/2001 | Traxler | 248/562 |
| 6,786,172 | B1 | * | 9/2004 | Loffler | 114/363 |
| 6,889,625 | B1 | * | 5/2005 | Loffler | 114/363 |
| 2008/0282954 | A1 | * | 11/2008 | Reason | 114/71 |

FOREIGN PATENT DOCUMENTS

| | | | |
|---|---|---|---|
| JP | 03050093 | * | 3/1991 |

* cited by examiner

*Primary Examiner*—Dan Pihulic
(74) *Attorney, Agent, or Firm*—Mark O. Glut

(57) ABSTRACT

An apparatus for mitigating the effects of shock loading on occupants, cargo and gear the apparatus located in a watercraft the apparatus having a deck positioned and arranged in said watercraft for supporting thereon said occupants, cargo and gear, a hinge communicating with said deck and said watercraft and supporting the forwardly portion of said deck and permitting said deck to move and rotate about said hinge and prevent said deck from substantial side to side movement, a dampener communicating with said deck and said hull of said watercraft the dampener positioned and arranged to move in response to said moving and rotating deck and said dampener absorbing at least a portion of the energy of said moving deck as said deck moves and rotates, and a spring communicating with said deck and said hull of said watercraft the spring positioned and arranged to support the rearwardly portion on said deck and to move in response to said moving and rotating deck the spring absorbing at lease a portion of the energy of said moving and rotating deck and releasing said absorbed energy to raise the deck after said impacts.

1 Claim, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MOVABLE DECK TO MITIGATE EFFECTS OF SHOCK

The invention described herein may be manufactured and used by or for the Government of the United States of America for Government purposes without the payment of any royalties therein or therefore.

BACKGROUND OF THE INVENTION

The present invention relates to ships and other vessels that travel on the waterways. More specifically, but without limitation, the present invention relates to the deck of a watercraft, that is movably attached to the hull or other portion of the watercraft and that is capable of autonomous movement and that can absorb the shock forces generated as the hull of the watercraft contacts and slaps against the water especially while the watercraft is traveling at a high rate of speed and/or the sea is in a rough state.

The military is especially interested in developing watercraft that can travel at high rates of speed in any sea state and deliver its cargo without damage. This cargo includes special forces personnel that may be called upon to be at a particular location without regards to weather conditions. Sometimes, a mission may require the avoidance of enemy fire and/or detection which dictates a high rate of speed even when the sea state is rough. A rough sea state combined with increased speed can generate severe shock forces that are transmitted to the occupants of the watercraft as well as to their cargo and gear. Severe shock forces can also be generated when the sea state is relatively mild since a higher rate of speed in a relatively mild sea state can also generate significant shock forces that are likewise transmitted to occupants, their gear and to cargo. In fact, injury to the occupants may sometimes be a limiting factor to the rapid deployment and delivery of military personnel over the waterways.

These military personnel have to be restrained, as by strapping or other means, and provided handholds to prevent injury from contacting each other and structural elements of the vessel as well as to prevent premature ejection. In the event that an occupant or a piece of gear becomes unrestrained in the boat while severe shock or other forces are being generated, extensive damage to the occupant, boat and/or gear can result. Death is even possible. Even when occupants have been properly restrained, there have been severe injuries reported, such as, dislocated hips, sprained ankles and internal injuries to organs and the like. In addition, passenger fatigue, with or without injury, can result after occupants have been subjected to shock pounding for a time period that can decrease the effectiveness of personnel and compromise a military mission before hitting the ground. Time is also a factor. A mild pounding for a long time can be as injurious as a severe pounding for a short time. Therefore, time verses intensity must not be ignored.

As a result, a military mission can be compromised. Therefore, it is desirable to provide a mechanism that can mitigate the effects of shock force transmission to occupants, their gear and any onboard cargo. It is also desirable, to provide a apparatus that can allow a boat or other watercraft to travel at a higher rate of speed without the occupants, their gear and any cargo being adversely affected by shock forces. It is further desirable to provide an apparatus that will not add appreciable weight, bulk or complexity to an existing boat platform and that is reliable, simple, has low cost and that may be retrofitted to existing hulls as well as being incorporated into new designs.

SUMMARY OF THE INVENTION

Accordingly, the apparatus of the present invention includes a deck, positioned and arranged in the hull of a watercraft for supporting occupants, cargo and gear, the deck supported at its forwardly portion by a hinge that permits the deck to move and rotate about the hinge and the hinge substantially prohibiting side to side movement of the deck, a dampener that communicates with the deck and with the hull of the watercraft, the dampener positioned and arranged to move in response to the moving and rotating deck and absorbing at least a portion of the energy of the impacts of the moving deck as the deck moves upwardly and downwardly, and a spring communicating with the deck and the hull of the watercraft, the spring positioned and arranged to support the rearwardly portion of the deck and to move in response to the moving and rotating deck of the watercraft, the spring absorbing at least a portion of the energy of the moving deck as the deck moves downwardly and the spring thereafter releasing the absorbed energy to raise the deck.

The apparatus may include more than one dampener and more than one spring. The preferred embodiment includes a plurality of dampeners and springs positioned and arranged at the rearwardly portion of the deck.

DETAILED DESCRIPTION OF THE PREFERRED EMBODIMENT

Figure 1:
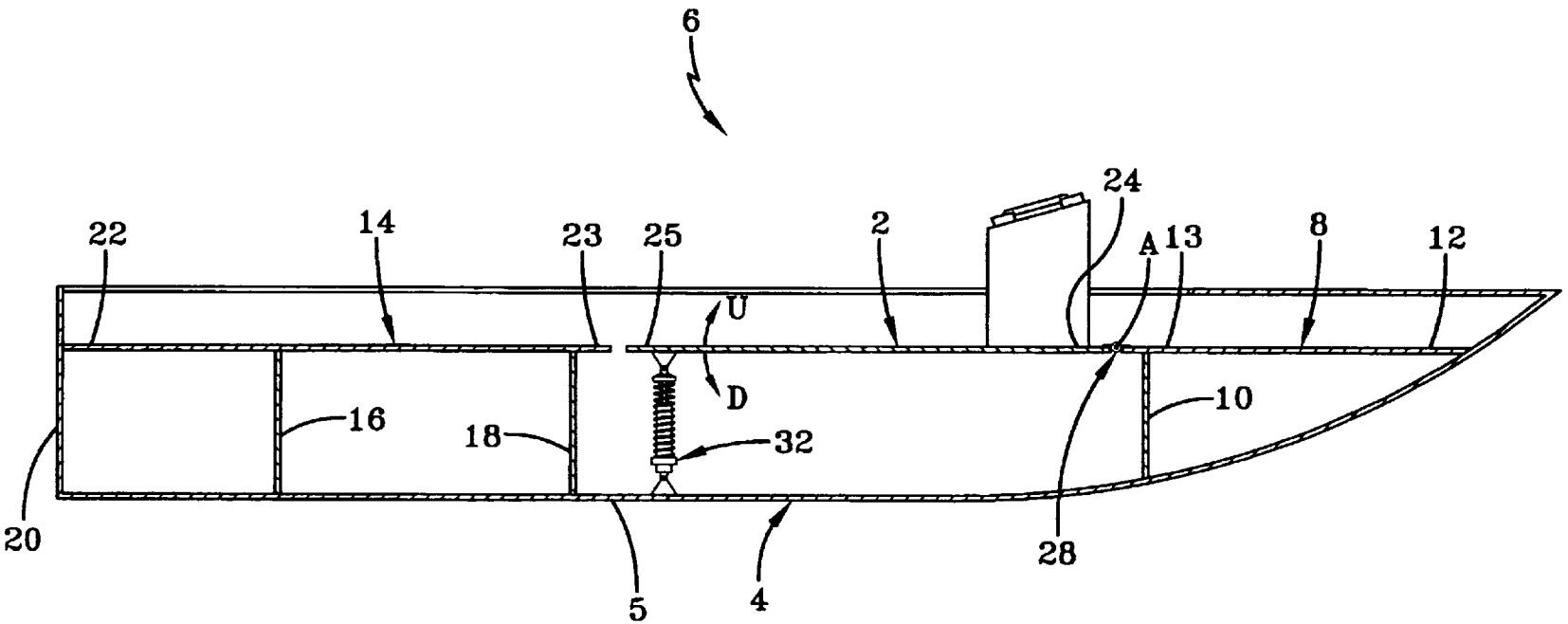
FIG. 1 is a X-sectional view of the movable deck of the present invention.

The preferred embodiment of the present invention is illustrated by way of example in FIGS. 1–6. As shown in FIG. 1, movable deck 2 of the present invention is located within hull 4 of vessel 6. Vessel 6 includes fixed forward deck portion 8 suspended above bottom 5 by support 10 and attached to hull 4 at forwardly end 12. Vessel 6 also includes fixed rearward portion 14 suspended above bottom 5 by supports 16 and 18 and attached to transom 20 at rearwardly end 22. In the preferred embodiment, movable deck 2 is located between forward deck portion 8 and rearward deck portion 14, as shown in FIG. 1. Forward end 24 of movable deck 2 is attached, continuously or intermittingly, to first side 26 of hinge 28 and rearward end 13 of forward deck portion 8 is attached, continuously or intermittingly, to second side 30 of hinge 28 (see FIG. 3). In the preferred embodiment, hinge 28 extends across the entire width of movable deck 2. In this way, movable deck 2 may rotate about axis "A" and move upwardly and downwardly as indicated by arrows "U" and "D", respectively (see FIG. 1). Hinge 28 restricts the side to side movement of movable deck 2 and tends to cause pure rotational movement of movable deck 2 about axis A.

Dampeners or energy absorbing units 32 are located proximate rearward end 25 of movable deck 2. One end of unit 32 is a attached to bottom 5, for example, and the other end is attached to movable deck 2, as shown in FIG. 1. It should be noted that rearward end 25 of movable deck 2 may be located at a more rearwardly position than shown in FIG. 1. For example, rearward end 25 may be proximate transom 20 thereby providing a longer movable deck 2. In such a case, cover 14 would be correspondingly shorter to accommodate longer movable deck portion 2. In some cases, movable deck 2 may extend adjacent transom 20. In such a case, cover 14 may be deleted. A longer movable deck 2, extending adjacent transom 20, is shown in FIG. 2.

Figure 2:
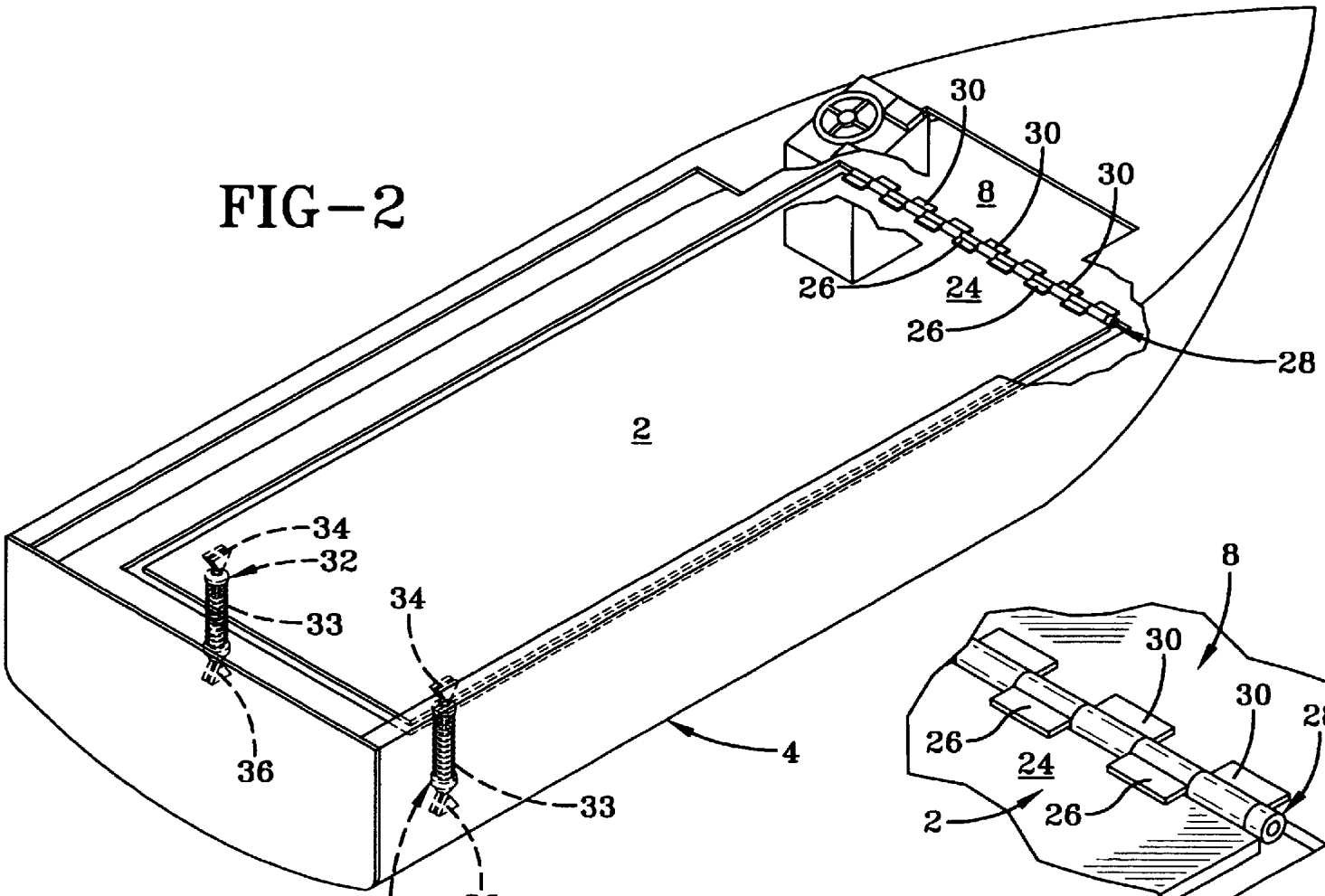
FIG. 2 is a perspective view of the movable deck of the present invention.
Figure 4:
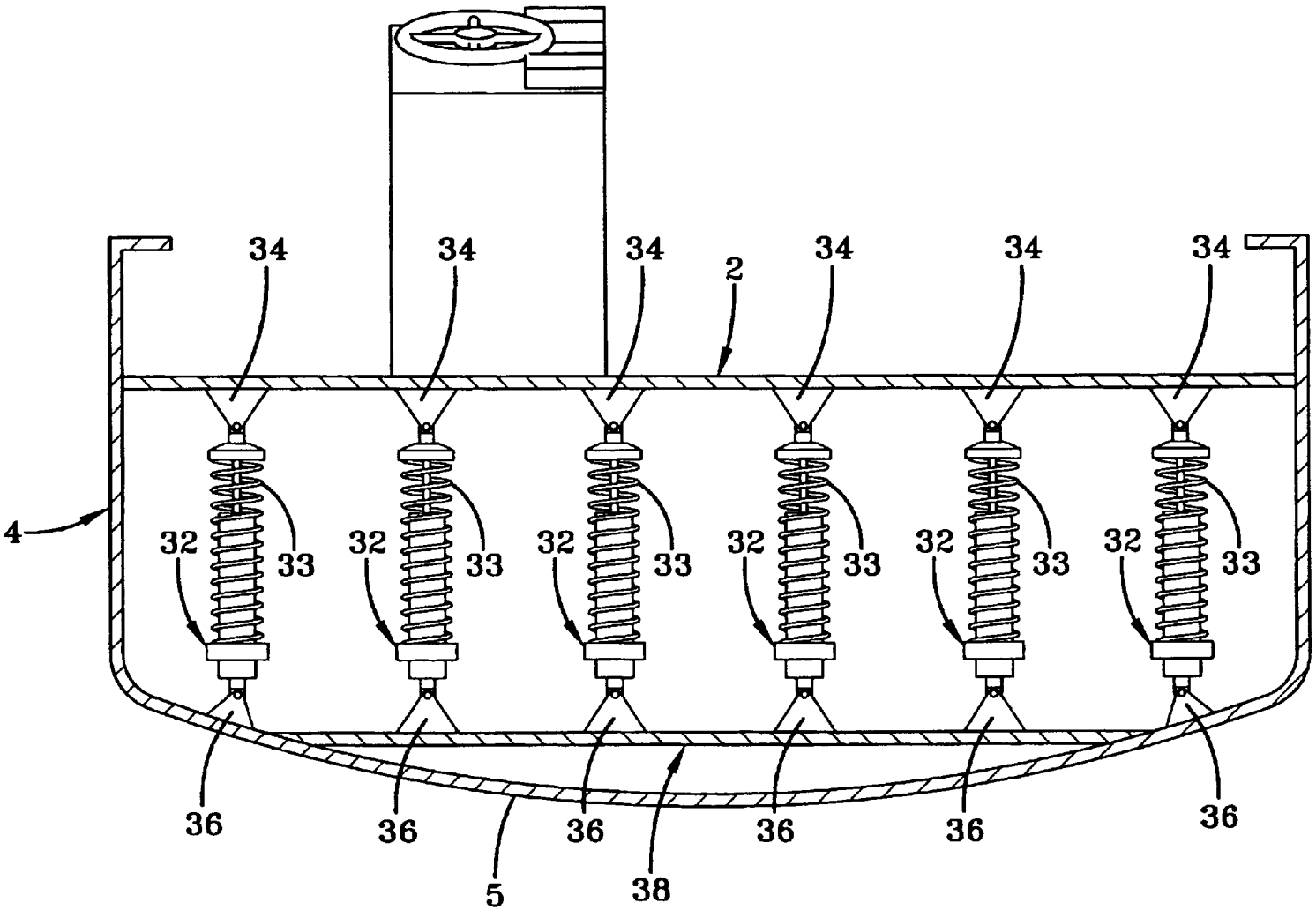
FIG. 4 is a rear X-sectional view of the present invention showing the dampeners and springs.

FIG. 2 shows two dampeners 32 attached to movable deck 2 via brackets 34 and attached to bottom 5 of hull 4 via brackets 36. FIG. 4 shows a plurality of dampeners 32 attached to movable deck 2 via brackets 34 and attached to sub-bottom 38 via brackets 36. The plurality of dampeners 32 extend across the width of movable deck 2, as shown in FIG. 4. Note that in FIG. 4, the outermost dampeners attach to bottom 5. More or less dampeners may be used and in different configurations than shown in the drawings. For example, dampeners 32 may be employed at intermediate locations between forward end 24 and rearward end 25 of movable deck 2 or on the sides or therebetween. In this way, a variety of dampening characteristics may be obtained without departing from the spirit of the present invention. Dampeners 32 may be, for example, oil or gas shock absorbers or other energy absorbing devices that work alone or in conjunction with suitable and preferred coil springs 33 or other types of springs or force storage/generating devices. For example, air filled baffles that dissipate energy and the like may be used as well as friction, hydraulic and electrical types known in the art.

Figure 3:
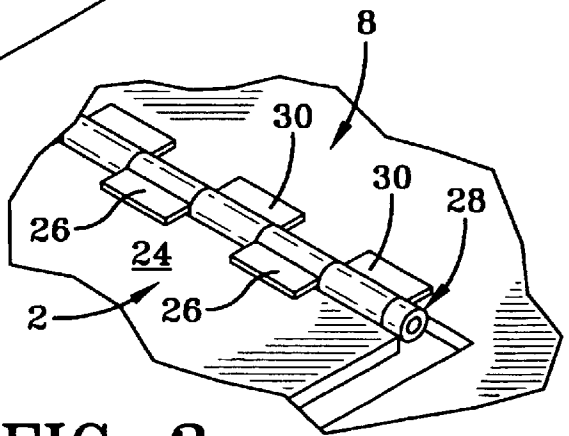
FIG. 3 is a perspective view of the hinge of the present invention.

Suitable and preferred coil springs 33, for example, may be located around dampeners 32, as shown in FIGS. 2 and 3, or may be located remote from dampeners 32 (not shown). Springs 33 may be adjusted for preload to position movable deck 2 in a more upwardly or downwardly static position relative to forward deck portion 8 and rearward deck portion 14, for example. Suitable and preferred coil spring adjusters are found in automotive and motorcycle suspension units and include an upper and lower perch that locates and holds captive coil spring 33. One or more of the spring perches is adjustable, for example, by rotating the perch on a threaded collar to move the perch one way or the other to raise or lower the perch and thereby adjust the coil spring riding in the perch up or down. In this way, springs 33 may be used to compensate for various static loads placed upon movable deck 2 and to preload the spring to adjust for anticipated impact loading due to the slapping of hull 2 on the sea surface. One or more springs may be employed as well as one or more dampeners. It is desirable to choose the combined spring rate and combined dampening rate in accordance with the desired load to be carried and the rate at which the energy absorbed by the springs is required to be dissipated. These rates are a function of the speed of the watercraft and magnitude of the slapping of the hull of the watercraft. Springs may be adjusted for setting the height of deck 2 by adjusting the spring perches or the spring rate may be modified by removing and replacing a spring.

Other types of springs may be employed. For example, leaf type springs, wishbone springs and other types known in the art may be used.

In operation, deck 2 will move downwardly in response to an impact. Such force will compress spring 33 (and dampener 32), storing the energy of the impact as potential energy in the spring. Once the total force of the impact has been absorbed by spring 33 and deck 2 has become stationary with its rearward end 25 in a downwardly position relative to forwardly end 23 of rearward deck portion 14, spring 33 will begin to expand and release its stored energy by moving deck 2 back to its static position. Dampener 32 will provide resistance as it is elongated by the action of spring 33 and at least a portion of the stored energy in spring 33 will be converted to heat by doing work on dampener 32. In this way impacts to occupants, equipment and gear located on deck 2 will be reduced (mitigated).

Figure 5:
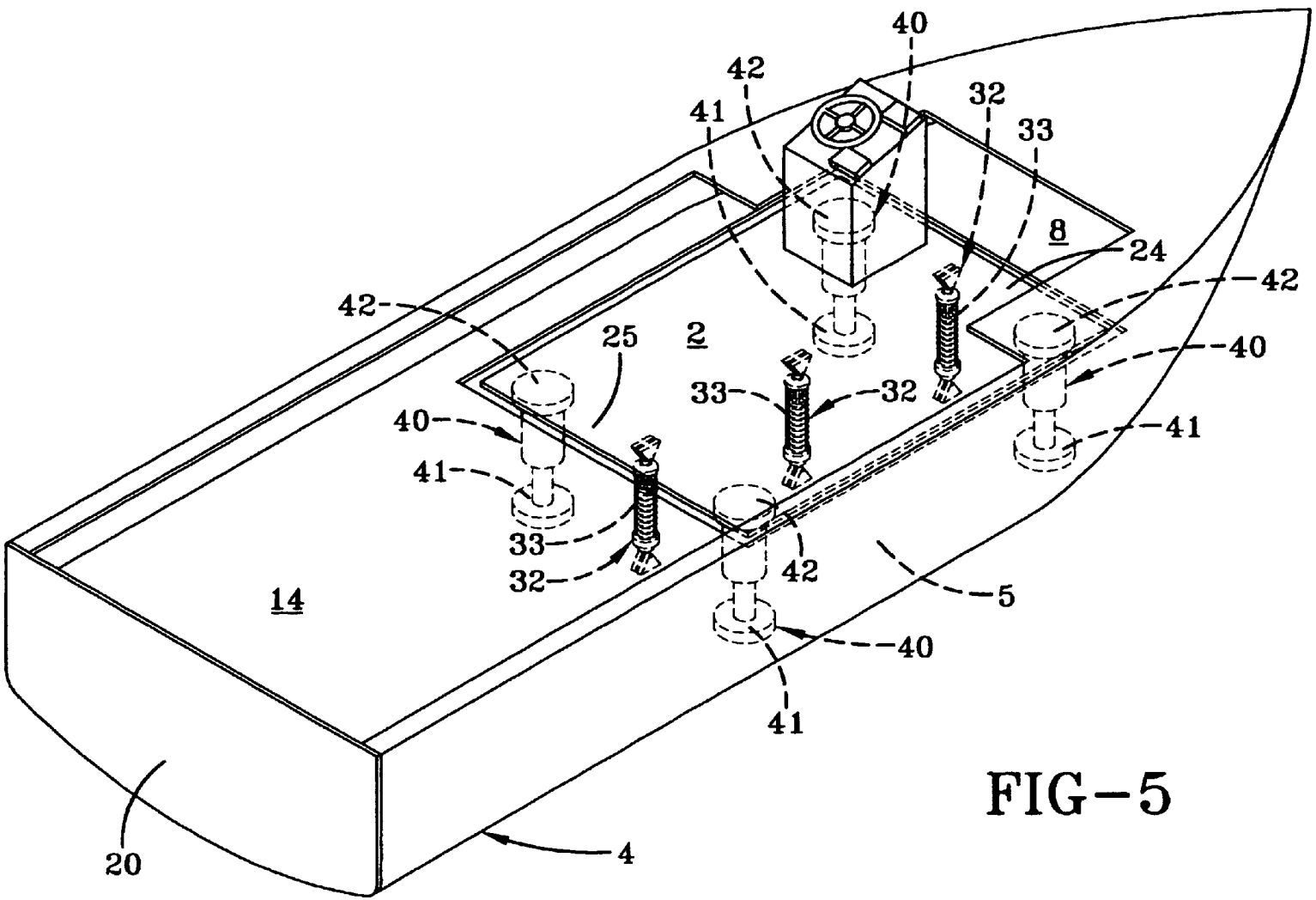
FIG. 5 is a perspective view of an alternate embodiment of the present invention.
Figure 6:
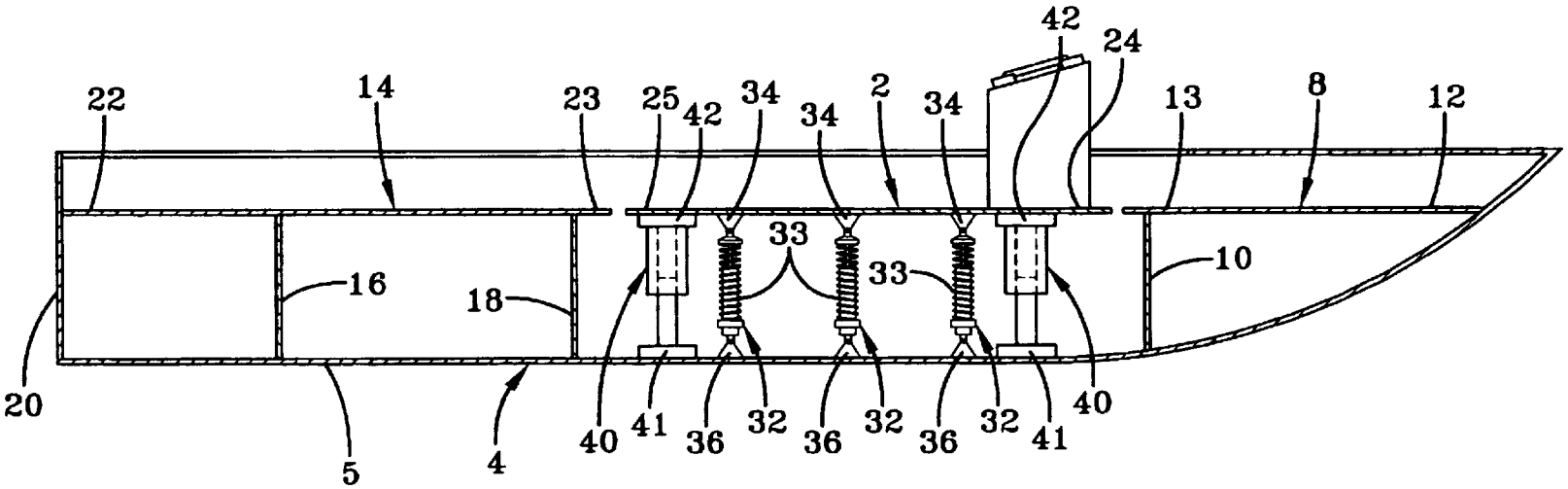
FIG. 6 is a X-sectional view of an alternate embodiment of the present invention.

FIGS. 5 and 6 show an alternate embodiment of the present invention. As shown in FIGS. 5 and 6, movable deck 2 is located in hull 4. Locaters 40 are positioned and arranged in the approximate corners of deck 2. However, it should be understood that other arrangements of locaters 40 as well as more or less locaters than 4 may be used. For example, one locater 40 may be utilized and located in the approximate center of movable deck 2. In addition, 3 locators 40 may be utilized and positioned and arranged to attach to movable deck 2 in a triangular manner. Many arrangements are possible and may be used. Locaters 40 are attached at first end 41 to bottom 5 of hull 4 and attached at second end 42 to movable deck 2. Second end 42 is a slip fit over first end 41 thereby locating and guiding movable deck 2 as movable deck 2 moves upwardly and downwardly. Side to side movement of movable deck 2 is substantially prevented.

Dampeners 32 are preferably positioned and arranged, along the center of movable deck 2, as shown in FIG. 5. However, it should be understood that other arrangements of dampeners 32 as well as more or less dampeners may be used. One end 36 (downwardly facing end) of dampener 32 communicates with bottom 5 and the other end 34 (upwardly facing end) of dampener 32 communicates with movable deck 2.

Coil springs 33 are preferably located over dampeners 32 however dampeners 32 and springs 33 may be positioned and arranged remotely from each other. Other types of dampeners and springs may be used in ways known in the art and as described fully hereinabove especially as described in the preferred embodiment above. In should also be noted that a dampener and a spring may be positioned and arranged as a unit preferably the spring located over the dampener. Similarly, a dampener and a locater may be fashioned as a unit, such unit commonly found in the front suspensions of automobiles and commonly referred to as a "strut". In such a case, the dampener has enlarged components to not only damp but to control unwanted movement usually and especially side to side movement without bending, twisting, or shearing within the constraints of the design. Further, the locater, dampener and spring may be positioned and arranged as a unit, such unit commonly found in the front suspensions of automobiles and referred to as a "coil over strut", "spring strut" or the like. Such variations may be employed in the present invention to design around space limitations, meet costs ceilings, effect superior results in regards to performance of the present invention and the like without departing from the spirit of the invention.

In operation, movable deck 2 may move upwardly and downwardly in response to forces generated by hull 4 slapping against the water. Springs 33 support movable deck 2 ( and any personnel, cargo and gear located thereon) at the desired static level and springs 33 compress and absorb at least a portion of the force generated by hull 4 slapping against the water thereby permitting movable deck 2 to move downwardly. Springs 33 then release their stored energy and cause movable deck 2 to be moved upwardly to the original static position and, at the same time, dampeners 32 absorb at least a portion of the energy stored in springs 33. In this way, the present invention mitigates the effect of the forces generated and transmitted to the passengers, cargo, gear and any other items located on movable deck 2, and permits the watercraft to travel at increased speed and/or in a higher sea state than that which was previously possible without the present invention.

Accordingly, passengers may arrive at their destination more refreshed and with less injuries than previously observed. In addition, the watercraft can now travel faster thereby presenting a more formidable opponent in a combat situation and reduce injuries to our servicemen and servicewomen and save lives.

It is to be understood, that various modifications may be made to the above described apparatus, without departing from the spirit of the invention. For example, the hinge 28 may be attached to the deck at the rearwardly portion of the deck and dampeners 32 and springs 33 positioned and arranged to communicate with the forwardly portion of the deck. In addition, the dampeners 32 and springs 33 may be positioned and arranged to communicate with the deck and hull or other portion of the watercraft to accomplish different loading and absorbing schemes know to those skilled in the art.

Obviously, many modifications and variations of the present invention are possible in light of the above teachings. It is therefore to be understood that within the scope of the appended claims, the invention may be practiced other than as specifically described.

What is claimed is:

1. An apparatus for mitigating the effects of shock loading on occupants, cargo and gear located in a watercraft having a hull, while said hull of said watercraft is slapping against the water, the apparatus comprising:

a. a deck, having a forwardly portion and a rearwardly portion, said deck positioned and arranged in said hull of said watercraft for supporting thereon said occupants, cargo and gear;

b. a hinge, communicating with said deck and with said hull of said watercraft, said hinge supporting deck and permitting said deck to move and rotate about said hinge in response to forces generated by said hull of said watercraft slapping against said water, said hinge substantially prohibiting said deck from side to side movement of said deck;

c. a dampener, communicating with said deck and with said hull of said watercraft, said dampener positioned and arranged to move in response to said moving and rotating deck of said watercraft, said dampener absorbing at least a portion of the energy of said forces of said moving deck as said deck moves downwardly and upwardly; and, d. a spring, communicating with said deck and with said hull of said watercraft, said spring positioned and arranged to support said deck and to move in response to said moving and rotating deck of said watercraft, said spring absorbing at least a portion of the energy of said moving deck as said deck moves downwardly, said spring releasing said absorbed energy to raise said deck after said impacts.

* * * * *